(12) United States Patent
Wilcox et al.

(10) Patent No.: US 12,078,196 B2
(45) Date of Patent: Sep. 3, 2024

(54) ANTI-SHINGLE RIVETS

(71) Applicant: Howmet Aerospace Inc., Pittsburgh, PA (US)

(72) Inventors: Robert B. Wilcox, McGregor, TX (US); Stanley E. Wojciechowski, Waco, TX (US)

(73) Assignee: HOWMET AEROSPACE INC., Pittsburgh, PA (US)

( * ) Notice: Subject to any disclaimer, the term of this patent is extended or adjusted under 35 U.S.C. 154(b) by 197 days.

(21) Appl. No.: 17/760,405

(22) PCT Filed: Mar. 4, 2021

(86) PCT No.: PCT/US2021/020912
§ 371 (c)(1),
(2) Date: Aug. 9, 2022

(87) PCT Pub. No.: WO2021/183366
PCT Pub. Date: Sep. 16, 2021

(65) Prior Publication Data
US 2023/0073533 A1   Mar. 9, 2023

Related U.S. Application Data

(60) Provisional application No. 62/989,108, filed on Mar. 13, 2020, provisional application No. 63/018,941, filed on May 1, 2020.

(51) Int. Cl.
*F16B 19/06* (2006.01)
(52) U.S. Cl.
CPC .................................. *F16B 19/06* (2013.01)

(58) Field of Classification Search
CPC .......... F16B 15/02; F16B 15/04; F16B 15/06; F16B 15/08; F16B 19/00; F16B 19/06; F16B 19/086; F16B 27/00
USPC ........ 411/438, 442–444, 450, 481, 500–501, 411/507, 439
See application file for complete search history.

(56) References Cited

U.S. PATENT DOCUMENTS

| | | | | |
|---|---|---|---|---|
| 3,587,842 A * | 6/1971 | Keck et al. | ............ | F16B 27/00 206/345 |
| 3,900,132 A | 8/1975 | Kuehn et al. | | |
| 6,494,322 B1 * | 12/2002 | Habermehl | ............ | F16B 27/00 206/820 |
| 6,988,862 B1 * | 1/2006 | Iguchi | ................ | F16B 19/1027 411/501 |
| 8,985,923 B2 * | 3/2015 | Jones | ................ | F16B 19/1054 411/501 |

(Continued)

FOREIGN PATENT DOCUMENTS

| | | |
|---|---|---|
| JP | 2015042417 A | 3/2015 |
| WO | 2017165814 A2 | 9/2017 |
| WO | 2019118659 A1 | 6/2019 |

OTHER PUBLICATIONS

International Search Report and Written Opinion of the International Searching Authority for International Application No. PCT/US2021/020912 mailed Jun. 28, 2021.

*Primary Examiner* — Roberta S Delisle
(74) *Attorney, Agent, or Firm* — K&L Gates LLP

(57) ABSTRACT

Anti-shingle rivets are provided. The anti-shingle rivets comprise a head portion comprising an outer edge configured to inhibit shingling in a rivet delivery system and a shank extending from the head portion.

17 Claims, 8 Drawing Sheets

(56) References Cited

U.S. PATENT DOCUMENTS

| | | | | |
|---|---|---|---|---|
| 2005/0133392 | A1* | 6/2005 | Habermehl | F16B 27/00 |
| | | | | 206/338 |
| 2011/0129317 | A1* | 6/2011 | Makino | F16B 19/1054 |
| | | | | 411/439 |
| 2013/0209196 | A1* | 8/2013 | Brewer | F16B 19/1045 |
| | | | | 29/244 |
| 2014/0356101 | A1 | 12/2014 | Bassler et al. | |
| 2015/0144602 | A1* | 5/2015 | Draht | B23K 20/02 |
| | | | | 228/141.1 |
| 2016/0123362 | A1* | 5/2016 | Iwase | F16B 19/06 |
| | | | | 411/82 |
| 2018/0209468 | A1* | 7/2018 | Freis | F16B 33/008 |
| 2018/0283423 | A1* | 10/2018 | Huff | F16B 19/086 |
| 2023/0184281 | A1* | 6/2023 | Li | B21J 15/025 |
| | | | | 411/501 |

\* cited by examiner

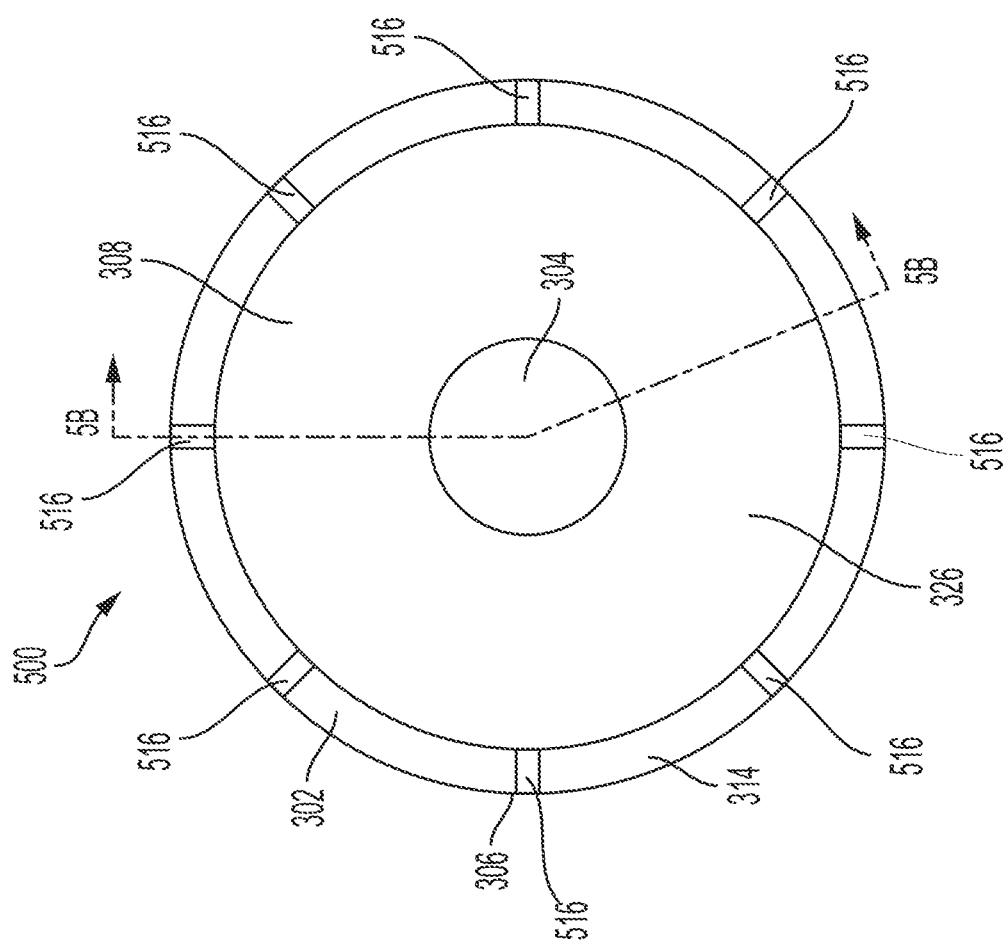

ANTI-SHINGLE RIVETS

FIELD OF USE

The present disclosure relates to anti-shingle rivets.

BACKGROUND

Current methods of fastening work pieces together can include the use of, for example, self-piercing rivets or flow drill rivets. Other methods of fastening can require automated feeding of rivets to a resistance spot rivet welding apparatus. There are challenges with feeding rivets to a resistance spot rivet welding system.

SUMMARY

One aspect of the present disclosure is directed to a rivet comprising a head portion and a shank extending from the head portion, wherein the head portion comprises an outer edge configured to inhibit shingling of the rivet in a rivet delivery system.

Another aspect according to the present disclosure is directed to a rivet comprising a head portion and a shank extending from the head portion. The head portion comprises a first portion having a first thickness and a second portion having a second thickness. The first thickness is less than the second thickness. The first portion is intermediate the second portion and the shank, and the head portion extends around a periphery of the shank.

Another aspect according to the present disclosure is directed to a rivet comprising a head portion and a shank extending from the head portion. The head portion comprises a blunt outer edge that can inhibit point-to-point contact on a beveled edge that could otherwise result in wedging forces leading to jamming of rivets in precision rivet feed tracks.

It is understood that the inventions disclosed and described in this specification are not limited to the aspects summarized in this Summary. The reader will appreciate the foregoing details, as well as others, upon considering the following detailed description of various non-limiting and non-exhaustive aspects according to this specification.

BRIEF DESCRIPTION OF THE DRAWINGS

The features and advantages of the examples, and the manner of attaining them, will become more apparent, and the examples will be better understood, by reference to the following description taken in conjunction with the accompanying drawings, wherein:

FIG. 5A is a bottom view of a non-limiting embodiment of an anti-shingle rivet according to the present disclosure.

Corresponding reference characters indicate corresponding parts throughout the several views. The exemplifications set out herein illustrate certain embodiments, in one form, and such exemplifications are not to be construed as limiting the scope of the appended claims in any manner.

DETAILED DESCRIPTION

Various embodiments are described and illustrated herein to provide an overall understanding of the structure, function, and use of the disclosed articles and methods. The various embodiments described and illustrated herein are non-limiting and non-exhaustive. Thus, an invention is not limited by the description of the various non-limiting and non-exhaustive embodiments disclosed herein. Rather, the invention is defined solely by the claims. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. The various embodiments disclosed and described in this specification can comprise, consist of, or consist essentially of the features and characteristics as variously described herein.

Resistance Spot Rivet (RSR™) joining technology is a new resistance joining technology that can allow joining of a variety of part assemblies made from various combinations of materials. RSR™ joining technology employs rivets (e.g., metallic rivets) of various geometries and materials to offer a selection of solutions to match each joining scenario. Rivets can be applied to the joint using a modified resistance spot welding gun (e.g., RDS enabled weld gun). The welding gun can be paired with a robotic manipulator and/or a pedestal welder and integrated into a system of auxiliary components. Each joint made using RSR™ joining technology typically consumes one rivet.

When a rivet is required for joining of parts, a rivet dispenser system can convey rivets to a location proximal to the location of installation of the rivet on the part assembly being joined utilizing a channel (e.g., feed track) of a rivet delivery system. The channel can be configured (e.g., sized and shaped) to allow passage of rivets from one end of the channel to another in a series arrangement and in a preselected orientation such that the rivets can engage with a rivet holder of a resistance spot rivet welding apparatus. For example, the channel can comprise a generally T-shaped cross-section suitable to receive and transport rivets having a generally T-shaped profile. For example, a top region of the T-shaped cross-section of a channel can be sized to accommodate a head portion of a rivet, and a transverse region of the T-shaped cross-section of the channel can be sized to accommodate a shank of the rivet.

Figure 1:
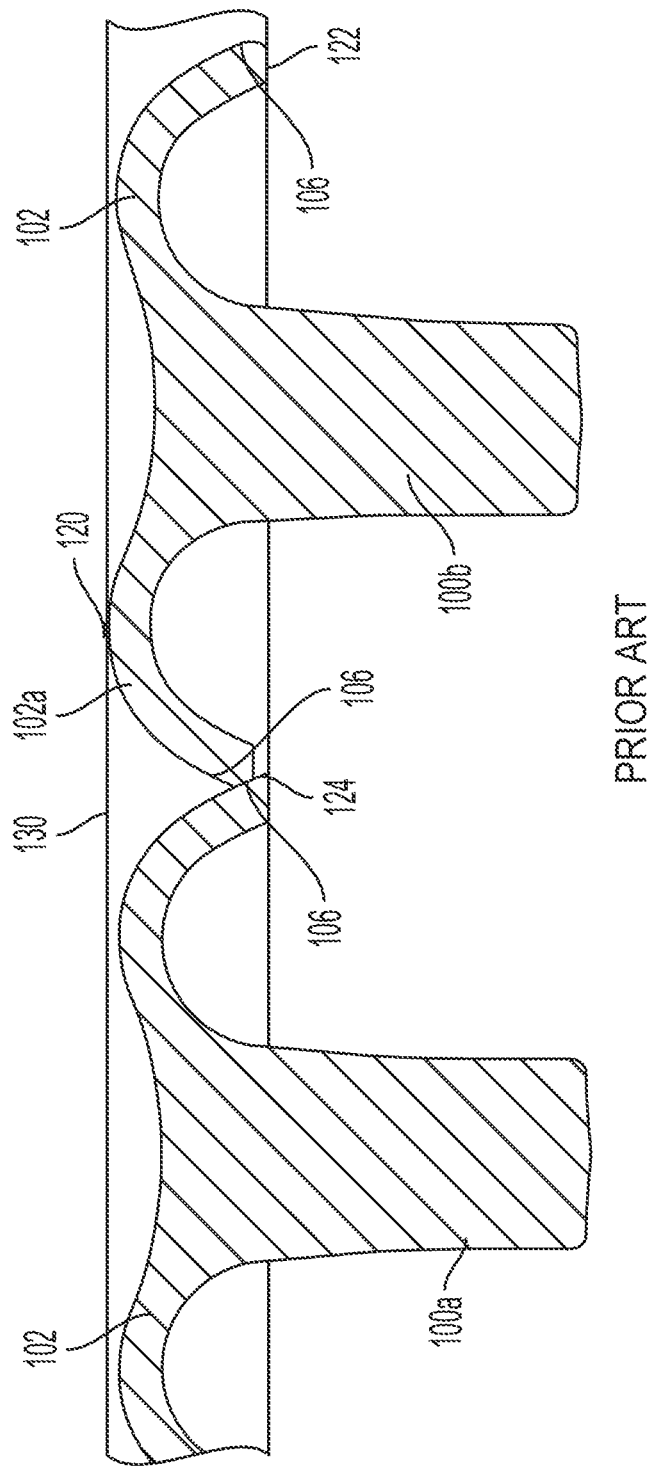
FIG. 1 is a front cross-sectional view of rivets experiencing a shingling effect.
Figure 2:
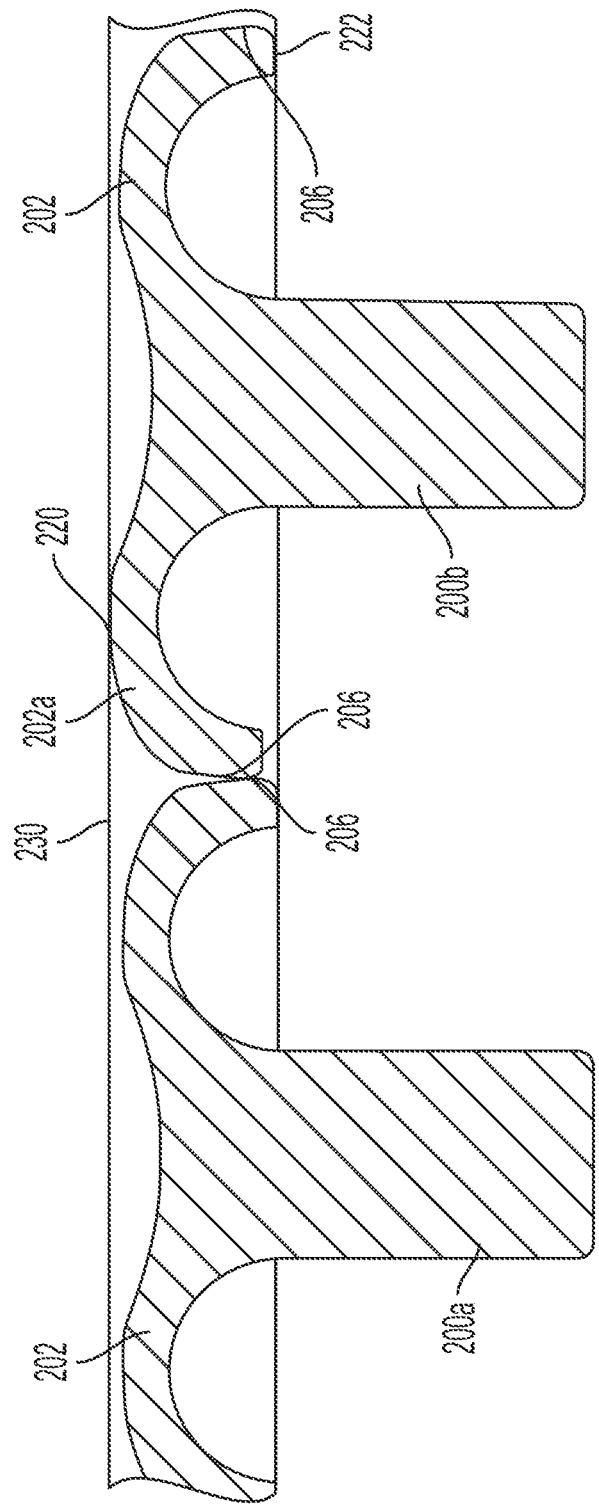
FIG. 2 is a front cross-sectional view of a non-limiting embodiment of rivets according to the present disclosure comprising a cylindrical or shallow tapered outer edge that may not cause shingling in a rivet delivery system.

Prior rivets 100*a-b* have a shape with a head portion 102 that comprises a narrow leading edge 106 at an angle that can be easily formed on a cold header, but can jam in the channel 130 due to shingling (e.g., overlapping of the head portions 102 in the top region of the channel), as illustrated in FIG. 1. For example, the rivet 100*b* can contact the channel 130 at points 122 and 120 where a side 102*a* of the head portion 102 of the rivet 100*b* can lift up such that the leading edge 106 (as the rivets 100*a-b* move right to left in the drawing) of the rivet 100*b* is on top of the head portion 102 of rivet 100*a*, thereby causing a shingle effect 124 (e.g., wedging of rivets) which can prevent the rivets 100*a-b* from further movement within the channel 130.

Therefore, an anti-shingle rivet according to the present disclosure is provided which can comprise a blunt outer edge, which may be more difficult to manufacturer (as it, unlike the outer edge of conventional rivets, can be significantly more difficult to form on a cold header), but wherein the blunt outer edge can inhibit or prevent "point-to-point" type of contact on a beveled edge of the rivets which could otherwise result in wedging forces that could lead to jamming in the channels. Thus, anti-shingle rivets according to the present disclosure can resist shingling and can be fed through the rivet feed channel in a series arrangement and in a preselected orientation such that they can consistently and predictably engage with a rivet holder of a resistance spot rivet welding apparatus. The rivets according to the present disclosure can be automatically fed by a cartridge or a blow feeder without, or with less occurrence of, jamming or shingling.

According to aspects of the present disclosure, anti-shingle rivets 200*a-b* comprising a head portion 202 including a cylindrical or shallow tapered outer edge 206 that may not cause shingling in the rivet delivery system (RDS) are provided herein and illustrated in FIGS. 2, 3A-C, 4A-4C, and 5A-5B. For example, the rivet 200*b* can contact the channel 230 at points 222 and 220 where a side 202*a* of the head portion 202 of the rivet 200*b* can lift up slightly. However, due to the shape and configuration of the edge 206 the shingling effect can be minimized or prevented such that the rivets 200*a-b* can move through the channel 230 without jamming or shingling.

Figure 3B:
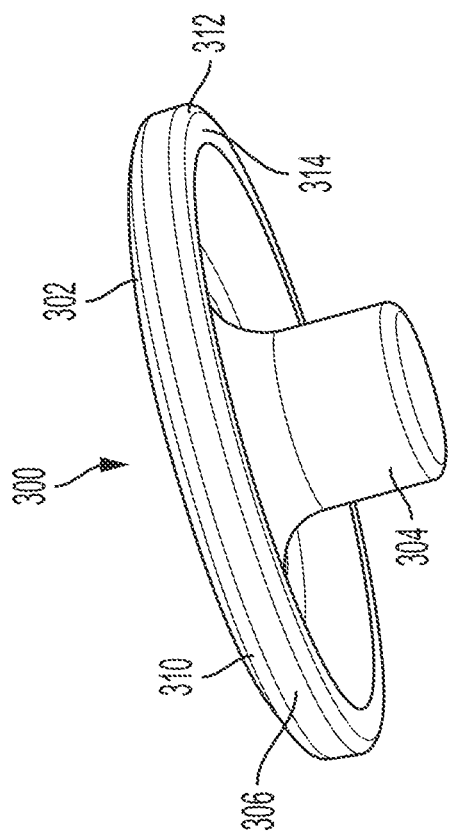
FIG. 3B is a bottom perspective view of the low profile anti-shingle rivet of FIG. 3A.
Figure 3A:
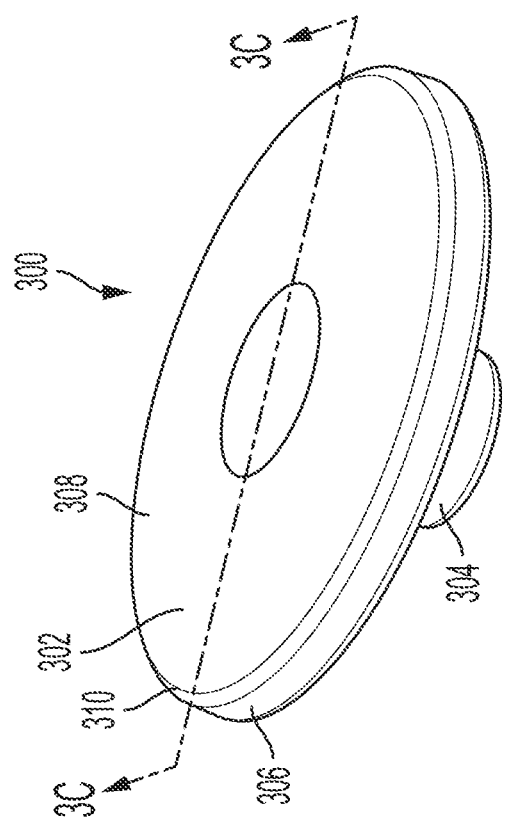
FIG. 3A is a top perspective view of a non-limiting embodiment of a low profile anti-shingle rivet according to the present disclosure.
Figure 3C:
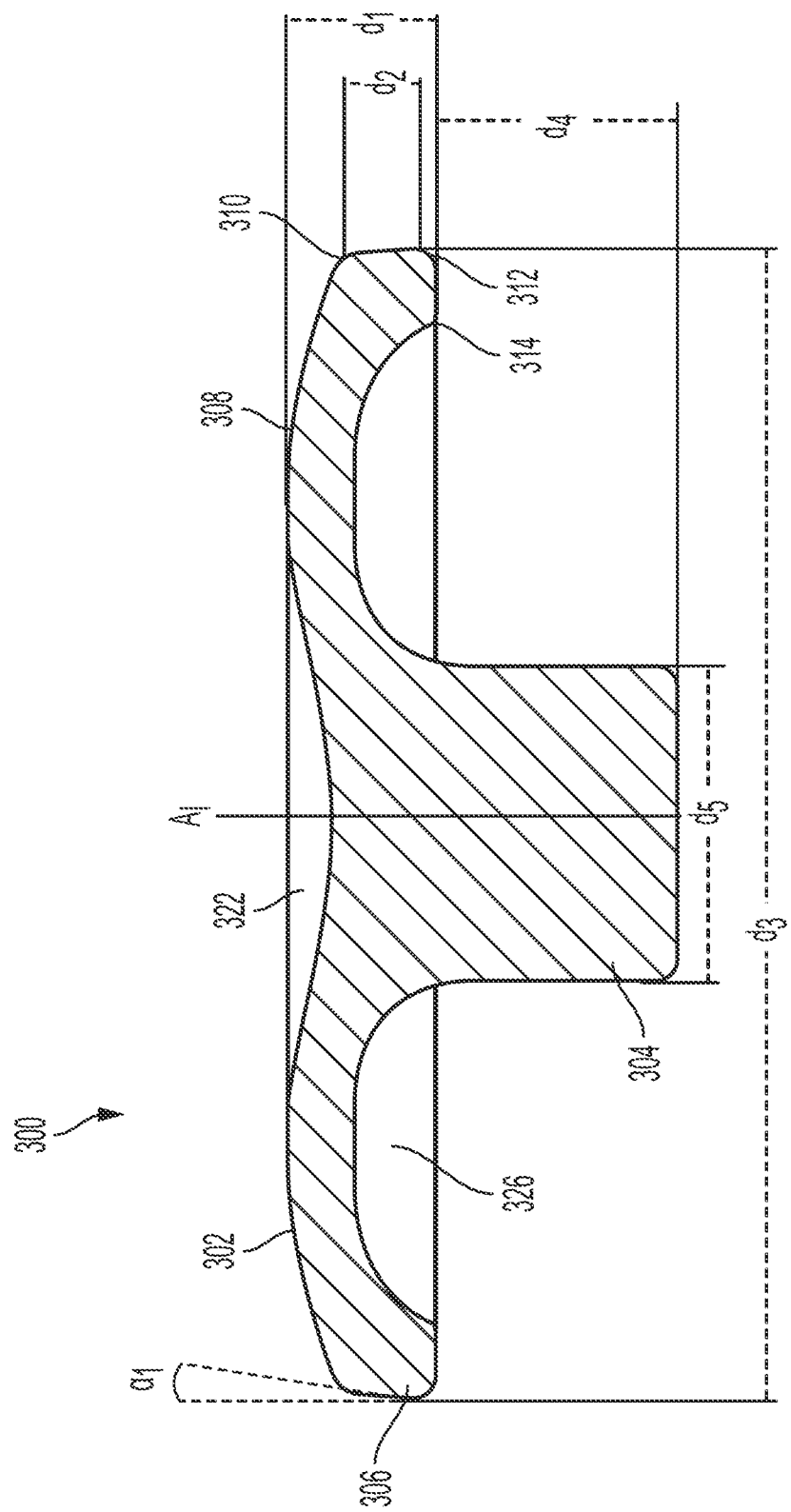
FIG. 3C is a cross-sectional view of the low profile anti-shingle rivet of FIG. 3A, taken along line 3C-3C.

Referring to FIGS. 3A-3C, an embodiment of an anti-shingle rivet 300 according to the present disclosure is provided. The anti-shingle rivet 300 can be configured to fasten layers of an assembly together utilizing a resistance spot rivet welding process. The anti-shingle rivet 300 comprises a head portion 302 and a shank 304 extending from the head portion 302 along a longitudinal axis, $A_1$, of the anti-shingle rivet 300. The head portion 302 can be configured for contact by an electrode of a resistance spot rivet welding system. For example, the head portion 302 can extend around a periphery of the shank 304 and can comprise, for example, an annular shape. In various non-limiting embodiments, a cavity 322 can extend through the head portion 302 and at least partially into the shank 304. The cavity 322 can be configured to facilitate contact between the anti-shingle rivet 300 and an electrode of the resistance sport rivet welding system. In certain non-limiting embodiments, the cavity 322 can be bowl-shaped.

The head portion 302 of the rivet 300 can comprise an outer edge 306. The outer edge 306 extends away from the shank 304 and defines an annular-shaped cavity 326. A bottom edge 314 of the head portion 302 can be configured to contact a layer of an assembly after installation utilizing a resistance spot rivet welding process. For example, the bottom edge 314 of the head portion 302 can be configured to engage/contact a layer of the assembly (e.g., apply a holding force) and minimally, if at all, penetrate through the engaged/contacted layer, while the shank 304 can be configured to pierce and/or melt through the engaged/contacted layer and/or a different layer of the assembly during a resistance spot rivet welding process. Additionally, the shank 304 of the rivet 300 can metallurgically bond to a layer of the assembly after installation.

The head portion 302 can extend a distance, $d_1$, along the longitudinal axis, $A_1$, of the anti-shingle rivet 300. In certain non-limiting embodiments, the distance, $d_1$, can be at least 0.5 mm, such as, for example, at least 1 mm, at least 1.5 mm, at least 2 mm, or at least 3 mm. In various non-limiting embodiments, the distance, $d_1$, can be no greater than 10 mm, such as, for example, no greater than 5 mm, no greater than 4 mm, no greater than 3 mm, no greater than 2 mm, or no greater than 1.5 mm. For example, the distance, $d_1$, can be in a range of 0.5 mm to 10 mm, such as, for example, 0.5 mm to 5 mm, 2 mm to 4 mm, or 1 mm to 2 mm.

The shank 304 can extend a distance, $d_4$, along the longitudinal axis, $A_1$. In certain non-limiting embodiments, the distance $d_4$ can be at least 1 mm, such as, for example, at least 3 mm, at least 4 mm, at least 5 mm, or at least 6 mm. In various non-limiting embodiments, the distance, $d_4$, can be no greater than 30 mm, such as, for example, no greater than 20 mm, no greater than 10 mm, no greater than 9 mm, no greater than 8 mm, or no greater than 6 mm. For example, the distance, $d_4$, can be in a range of 1 mm to 30 mm, such as, for example, 3 mm to 30 mm, 5 mm to 25 mm, 10 mm to 20 mm, 4 mm to 9 mm, or 5 mm to 8 mm.

In certain non-limiting embodiments, the shank 304 can comprise a diameter, $d_5$, no greater than 10 mm, such as, for example, no greater than 7 mm, no greater than 6 mm, no greater than 5 mm, or no greater than 4 mm, or no greater than 3 mm. In various non-limiting embodiments, the shank 304 can comprise a diameter, $d_5$, of at least 1 mm, such as, for example, at least 2 mm, at least 3 mm, at least 4 mm, at least 5 mm, at least 6 mm, or at least 7 mm. For example, the shank 118 can comprise a diameter, $d_5$, in a range of 1 mm to 10 mm, such as, for example, 2 mm to 5 mm, 2 mm to 7 mm, or 3 mm to 6 mm. In certain embodiments, a diameter of the shank 304 can decrease in a direction away from the head portion 302. In certain non-limiting embodiments, the diameter, $d_5$, of the shank 304 can be less than a diameter of an electrode of a resistance spot rivet welding system such that the shank 304 can apply an increased localized force to a layer of an assembly. In various non-limiting embodiments, the shank 304 comprises a generally cylindrical shape.

The outer edge 306 can comprise a shallow taper, $\alpha_1$, relative to the longitudinal axis, $A_1$. The outer edge 306 can minimize or prevent shingling of rivets in a rivet delivery channel. For example, the outer edge 306 can be substantially flat and/or substantially aligned with the longitudinal axis, $A_1$, of the anti-shingle rivet 300.

In various non-limiting embodiments, the shallow taper, $\alpha_1$, can be less than 15 degrees relative to the longitudinal axis, $A_1$, such as, for example, less than 14 degrees, less than 10 degrees, less than 8 degrees, less than 6 degrees, less than 5 degrees, less than 4 degrees, or less than 2 degrees, all relative to the longitudinal axis, $A_1$. In certain non-limiting embodiments, the shallow taper, $\alpha_1$, can be at least 0 degrees relative to the longitudinal axis, $A_1$, such as, for example, at least 1 degree, at least 2 degrees, at least 4 degrees, at least 5 degrees, at least 6 degrees, at least 8 degrees, or at least 10 degrees, all relative to the longitudinal axis, $A_1$. For example, the shallow taper, $\alpha_1$, can be in a range of 0 degrees to 15 degrees relative to the longitudinal axis, $A_1$, such as, for example, 1 degree to 14 degrees, 2 degrees to 14 degrees, 4 degrees to 12 degrees, 5 degrees to 10 degrees, or 6 degrees to 8 degrees, all relative to the longitudinal axis, $A_1$.

In various non-limiting embodiments, the shallow taper, $\alpha_1$, can be substantially 0 degrees relative to the longitudinal axis, $A_1$, and the outer edge 306 can comprise a cylindrical shape. For example, the outer edge 306 can be substantially parallel to the longitudinal axis, $A_1$. In certain other non-limiting embodiments, the shallow taper, $\alpha_1$, can be in a range of greater than 0 degrees to 15 degrees relative to the longitudinal axis, $A_1$, and can comprise a frustoconical shape. The outer edge 306 can be substantially flat or curved. For example, the outer edge 306 can comprise a cylindrical shape, a frustoconical shape, a concave shape, a convex shape, a stepped shaped, or other curved shape.

The outer edge 306 can extend a distance, $d_2$, generally in the direction of the longitudinal axis, $A_1$, of the rivet 300. In various non-limiting embodiments, the distance, $d_2$, can be at least 20 percent of the distance, $d_1$, such as, for example, at least 20 percent, at least 30 percent, at least 40 percent, at least 50 percent, at least 60 percent, at least 70 percent, or at least 80 percent of the distance, $d_1$. In certain non-limiting embodiments, the distance, $d_2$, can be no greater than the distance, $d_1$, such as, for example, no greater than 90 percent, no greater than 80 percent, or no greater than 70 percent of the distance, $d_1$. For example, the distance, $d_2$, can be in a range of 20 percent to 100 percent of the distance, $d_1$, such as, for example, 30 percent to 80 percent, 20 percent to 60 percent, 30 percent to 60 percent, or 30 percent to 40 percent of the distance, $d_1$. In certain non-limiting embodiments, the distance, $d_1$, can be 0.115 inch (2.9 mm) or greater. For example, the distance, $d_1$, can be 0.115 inch (2.9 mm) and the distance, $d_2$, can be 35% of the distance, $d_1$.

The head portion 302 of the anti-shingle rivet 300 can comprise a diameter, $d_3$, that is at least 4 mm, such as, for example, at least 5 mm, at least 6 mm, at least 7 mm, at least 10 mm, at least 12 mm, at least 14 mm, at least 15 mm, at least 16 mm, at least 18 mm, at least 20 mm, at least 22 mm, at least 24 mm, or at least 25 mm. In various non-limiting embodiments, the head portion 302 of the anti-shingle rivet 300 can comprise a diameter, $d_3$, no greater than 30 mm, no greater than 25 mm, no greater than 24 mm, no greater than 22 mm, no greater than 20 mm, no greater than 18 mm, no greater than 16 mm, such as, for example, no greater than 15 mm, no greater than 14 mm, no greater than 12 mm, no greater than 10 mm, or no greater than 7 mm. For example, in certain non-limiting embodiments, the head portion 302 of the anti-shingle rivet 300 can comprise a diameter, $d_3$, in a range of 4 mm to 30 mm, such as, for example, 5 mm to 25 mm, 10 mm to 18 mm, 10 mm to 14 mm, 14 mm to 18 mm, 20 mm to 25 mm, or 12 mm to 14 mm.

Manufacturing the anti-shingle rivet 300 can balance the difficulty of producing the outer edge 306 and the anti-shingle properties of the outer edge 306. For example, manufacturing the anti-shingle rivet 300 with an outer edge 306 that is cylindrical may enhance minimization or prevention of anti-shingling of rivets in a precision feed channel, while it may also present manufacturing challenges. In other embodiments, the outer edge 306 can comprise a frustoconical shape and/or a shallow taper that can reduce the difficulty of manufacturing the rivets, but may present challenges with ensuring the rivets do no jam or shingle in the channel. In various non-limiting embodiments, the outer edge 306 can be optimized for fast production, such as, for example, a production rate of at least 50 rivets/min, such as, for example, at least 100 rivets/min, at least 200 rivets/min, or at least 220 rivets/min.

In various non-limiting embodiments, the head portion 302 can comprise an underfill area 312 positioned near the bottom edge 314 of the head portion 302 and intermediate the outer edge 306 and the bottom edge 314. The underfill area 312 can be intentionally underfilled during manufacture of the rivet 300 in order to minimize or prevent flash from the production process or other point formation in the underfill area 312 which can inhibit movement of the rivet 300 in a channel. Additionally, the underfill area 312 can be minimized in order to inhibit or prevent the underfill area from becoming a ramp surface that could otherwise cause shingling of rivets.

In certain non-limiting embodiments, a transition 310 can be positioned intermediate the outer edge 306 and an upper surface 308 of the head portion 302. The transition 310 can comprise, for example, a radius or a frustoconical shape.

The anti-shingle rivet 300 can comprise a metal or a metal alloy. For example, the anti-shingle rivet 300 can comprise an electrically conductive material suitable to withstand a resistance spot rivet welding process. In various non-limiting embodiments, the anti-shingle rivet 300 can comprise at least one of aluminum, an aluminum alloy, iron, an iron alloy, titanium, and a titanium alloy.

Figure 4B:
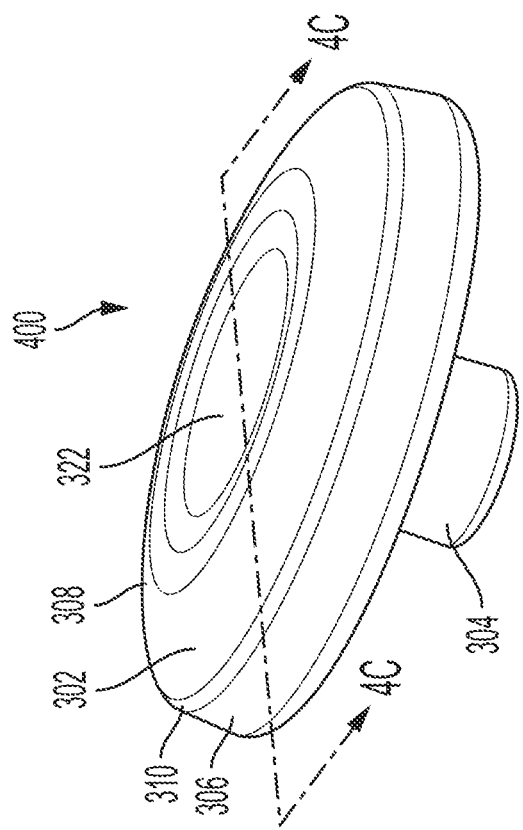
FIG. 4B is a bottom perspective view of the anti-shingle rivet of FIG. 4A.
Figure 4A:
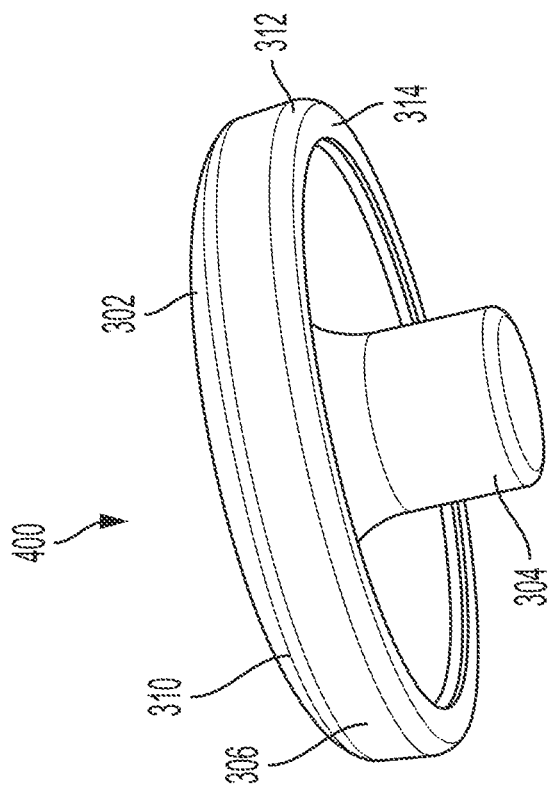
FIG. 4A is a top perspective view of a non-limiting embodiment of an anti-shingle rivet according to the present disclosure.
Figure 4C:
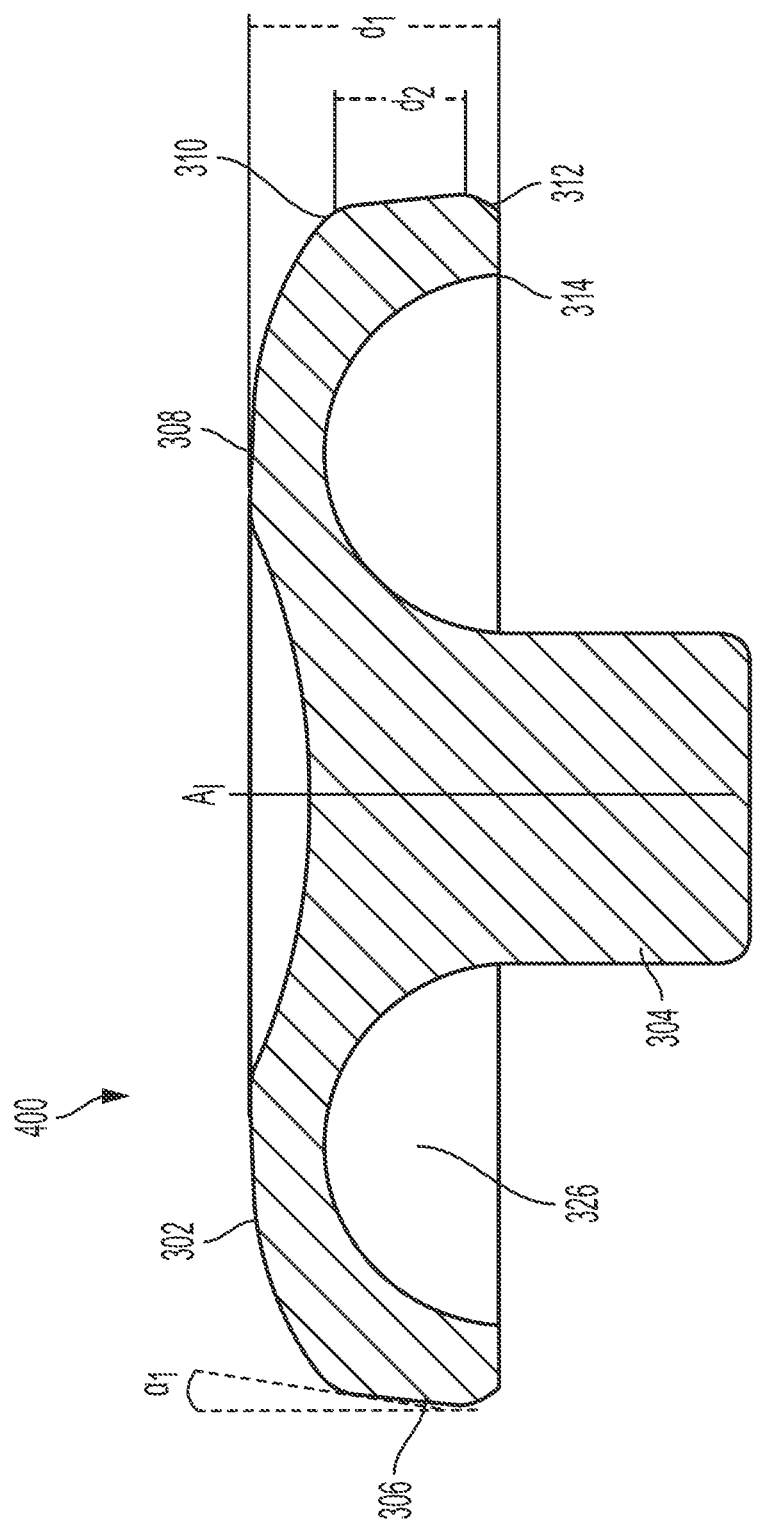
FIG. 4C is a cross-sectional view of the anti-shingle rivet of FIG. 4A, taken along line 4C-4C.

In various non-limiting embodiments, the anti-shingle rivet 300 can be a wider profile anti-shingle rivet. Referring to FIGS. 4A-4C, a non-limiting embodiment of an alternative configuration of an anti-shingle rivet 400 according to the present disclosure is provided to show an embodiment of such a wider profile anti-shingle rivet.

During a resistance spot rivet welding process without a pilot hole, the inventors of the present disclosure observed that the stiffness of the head portion of an anti-shingle rivet according to the present disclosure can affect the quality of the weld joint achieved. In certain non-limiting embodiments, reducing the stiffness of the head portion to accommodate displacement of the head portion relative to the shank can be advantageous. The reduced stiffness can enable a portion of the head portion of the anti-shingle rivet to be moved by an upper electrode of a resistance spot rivet welding system relative to the weld joint formed during the resistance spot rivet welding process. As a result, less compensation may be required by movement of a lower electrode of the resistance sport rivet welding system towards the weld joint, and more desirable fusion of the anti-shingle rivet to the assembly may be achieved.

Figure 5B:
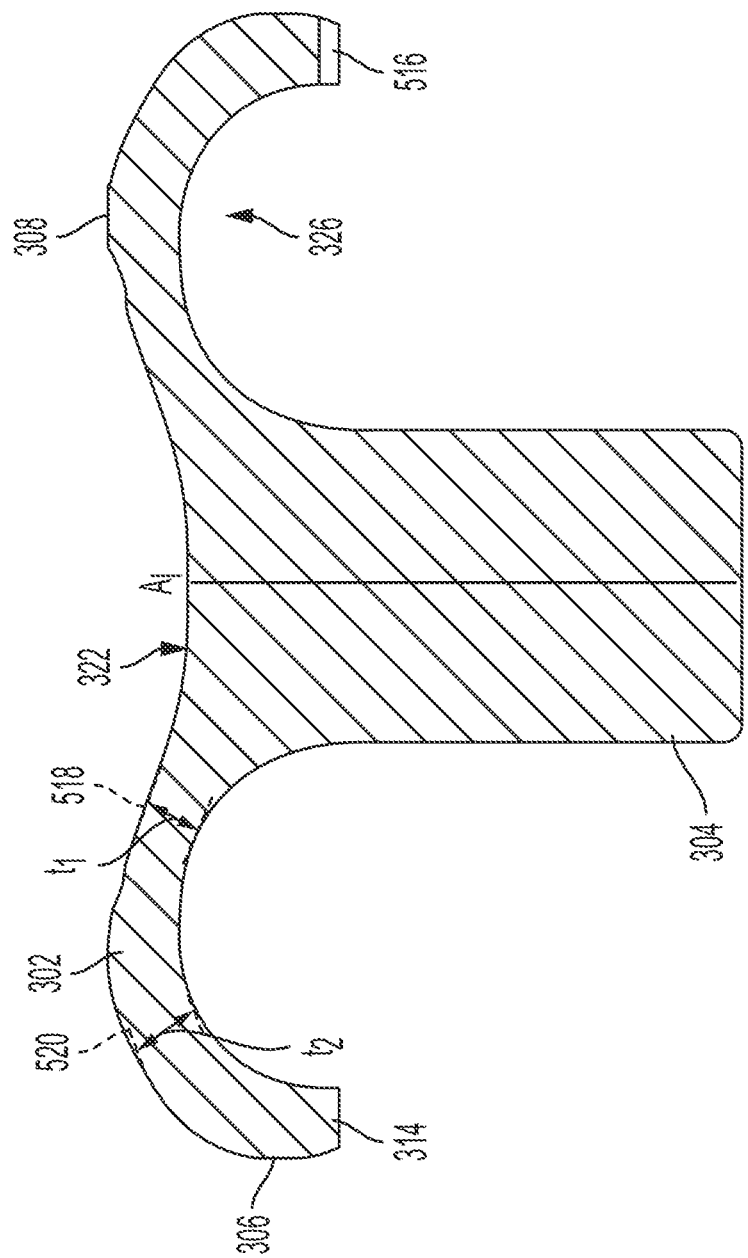
FIG. 5B is a cross-sectional view of the anti-shingle rivet of FIG. 5A, taken along line 5B-5B.

Referring to the non-limiting embodiment illustrated in FIGS. 5A-5B, an anti-shingle rivet 500 is provided with reduced stiffness in the head portion 302. The reduced stiffness can enable a higher quality weld joint and more desirable fusion of the anti-shingle rivet 500 to an assembly relative to substantially identical rivets lacking the reduced stiffness. In order to reduce the stiffness of the head portion 302, the anti-shingle rivet 500 comprises a first portion 518 of the head portion 302 having a first thickness, $t_1$, and a second portion 520 having a second thickness, $t_2$. The first thickness, $t_1$, is less than the second thickness, $t_2$, and the thickness difference reduces stiffness in the head portion 302. For example, in certain non-limiting embodiments the first thickness, $t_1$, can be at least 0.1 mm less than the second thickness, $t_2$, such as, for example, at least 0.2 mm less than the second thickness, $t_2$, or at least 0.3 mm less than the second thickness, $t_2$. The head portion 302 can comprise various alternative geometries to achieve the reduction in thickness, such as, for example, a stepped profile, a tapered profile, and/or a curved profile. The reduction in thickness can reduce the stiffness of the head portion 302 relative to axial displacement of the shank 304 along the longitudinal axis, $A_1$, without resulting in cracking of the head portion 302 during the spot rivet welding process due to excessive stresses associated with stiffness and high displacement. In various non-limiting embodiments, the anti-shingle rivet comprises a plurality of notches 516 configured to aid in dispersion of gas and material during a resistance spot rivet welding process. In certain non-limiting embodiments, as indicated in FIG. 5A, the notches 516 may be spaced apart along the bottom edge 314 around the periphery of the head portion 302.

Various aspects of certain embodiments according to the present disclosure include, but are not limited to, the aspects listed in the following numbered clauses.

1. A rivet comprising:
    a head portion comprising an outer edge configured to inhibit shingling in a rivet delivery system; and
    a shank extending from the head portion.
2. The rivet of clause 1, wherein the outer edge is cylindrical or comprises a taper in a range of 0 degrees to 15 degrees relative to a longitudinal axis of the rivet.
3. The rivet of any one of clauses 1-2, wherein the head portion extends a first distance along a longitudinal axis of the rivet and the outer edge extends a second distance along the longitudinal axis of the rivet, wherein the second distance is at least 20 percent of the first distance.
4. The rivet of clause 3, wherein the second distance is at least 30 percent of the first distance.
5. The rivet of any one of clauses 3-4, wherein the second distance is in a range of 30 percent to 40 percent of the first distance.
6. The rivet of any one of clauses 1-5, wherein the outer edge is substantially flat.
7. The rivet of any one of clauses 1-6, wherein the outer edge is curved.
8. The rivet of any one of clauses 1-7, wherein the head portion comprises an underfill area intermediate the outer edge and a bottom edge of the head portion.
9. The rivet of any one of clauses 1-8, wherein the head portion comprises a transition intermediate the outer edge and an upper surface of the head portion.
10. The rivet of clause 9, wherein the transition comprises a radius or a frustroconical shape.
11. The rivet of any one of clauses 1-10, wherein the head portion extends around a periphery of the shank and comprises a first portion having a first thickness and a second portion having a second thickness, wherein the first thickness is less than the second thickness, and wherein the first portion is intermediate the second portion and the shank.
12. The rivet of any one of clauses 1-11, wherein a cavity extends through the head portion and at least partially into the shank.
13. The rivet of any one of clauses 1-12, wherein the rivet can be automatically fed by a cartridge or a blow feeder without jamming.
14. The rivet of any one of clauses 1-13, wherein the rivet is configured for use in a resistance spot riveting system.
15. A method for manufacturing, comprising producing at least 50 rivets according to any of the preceding clauses per minute.
16. A method for manufacturing, comprising producing at least 100 rivets according to any of clauses 1-14 per minute.
17. A rivet comprising:
    a head portion comprising a first portion having a first thickness and a second portion having a second thickness, wherein the first thickness is less than the second thickness; and
    a shank extending from the head portion,
    wherein the first portion is intermediate the second portion and the shank, and the head portion extends around a periphery of the shank.
18. The rivet of clause 17, wherein the first thickness is at least 0.1 mm less than the second thickness, $t_2$.
19. The rivet of any one of clauses 17-18, wherein the head portion comprises at least one of a stepped profile, a tapered profile, and a curved profile.
20. A rivet comprising:
    a head portion comprising a blunt outer edge configured to inhibit point-to-point contact on a beveled edge, thereby inhibiting wedging forces that lead to jamming of rivets in precision feed tracks; and
    a shank extending from the head portion.

Any references herein to "various embodiments," "some embodiments," "one embodiment," "an embodiment," or like phrases mean that a particular feature, structure, or characteristic described in connection with the example is included in at least one embodiment. Thus, appearances of the phrases "in various embodiments," "in some embodiments," "in one embodiment," "in an embodiment," or like phrases in the specification do not necessarily refer to the same embodiment. Furthermore, the particular described features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation. Such modifications and variations are intended to be included within the scope of the present embodiments.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Also, all ranges recited herein are inclusive of the end points of the recited ranges. For example, a range of "1 to 10" includes the end points 1 and 10. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

The grammatical articles "a," "an," and "the," as used herein, are intended to include "at least one" or "one or more," unless otherwise indicated, even if "at least one" or "one or more" is expressly used in certain instances. Thus, the foregoing grammatical articles are used herein to refer to one or more than one (i.e., to "at least one") of the particular identified elements. Further, the use of a singular noun includes the plural and the use of a plural noun includes the singular, unless the context of the usage requires otherwise.

As used herein, a referenced element or region that is "intermediate" two other elements or regions means that the referenced element/region is disposed between, but is not necessarily in contact with, the two other elements/regions. Accordingly, for example, a referenced element that is "intermediate" a first element and a second element may or may not be immediately adjacent to or in contact with the first and/or second elements, and other elements may be disposed between the referenced element and the first and/or second elements.

One skilled in the art will recognize that the herein described articles and methods, and the discussion accompanying them, are used as examples for the sake of conceptual clarity and that various configuration modifications are contemplated. Consequently, as used herein, the specific examples/embodiments set forth and the accompanying discussion are intended to be representative of their more general classes. In general, use of any specific exemplar is intended to be representative of its class, and the non-inclusion of specific components, devices, operations/actions, and objects should not be taken to be limiting. While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed and not as more narrowly defined by particular illustrative aspects provided herein.

What is claimed is:

1. A rivet suitable for use in a rivet delivery channel of a rivet delivery system, the rivet comprising:
a head portion extending a first distance along a longitudinal axis of the rivet, the head portion comprising:
an outer edge defining an annular shaped cavity and configured to inhibit shingling in the rivet delivery channel of the rivet delivery system, and wherein the outer edge extends a second distance in a direction of the longitudinal axis in a range of 20 percent to 60 percent of the first distance; and
a shank extending from the head portion, wherein a cavity extends through the head portion and at least partially into the shank.

2. The rivet of claim 1, wherein the second distance is in a range of 30 percent to 40 percent of the first distance.

3. The rivet of claim 1, wherein the outer edge is substantially flat.

4. The rivet of claim 1, wherein the outer edge is curved.

5. The rivet of claim 1, wherein the head portion comprises an underfill area intermediate the outer edge and a bottom edge of the head portion.

6. The rivet of claim 1, wherein the head portion comprises a transition intermediate the outer edge and an upper surface of the head portion.

7. The rivet of claim 6, wherein the transition comprises a radius or a frustoconical shape.

8. The rivet of claim 1, wherein the head portion extends around a periphery of the shank and comprises a first portion having a first thickness and a second portion having a second thickness, wherein the first thickness is less than the second thickness, and wherein the first portion is intermediate the second portion and the shank.

9. The rivet of claim 1, wherein a cavity extends through the head portion and at least partially into the shank.

10. The rivet of claim 1, wherein the rivet can be automatically fed by a cartridge or a blow feeder without jamming.

11. The rivet of claim 1, wherein the rivet is configured for use in a resistance spot riveting system.

12. A method for manufacturing, comprising producing at least 50 of the rivet of claim 1 per minute.

13. A method for manufacturing, comprising producing at least 100 of the rivet of claim 1 per minute.

14. A rivet suitable for use in a rivet delivery channel of a rivet delivery system, the rivet comprising:
a head portion extending a first distance along a longitudinal axis of the rivet, the head portion comprising:
an outer edge defining an annular shaped cavity, wherein the outer edge extends a second distance in a direction of the longitudinal axis in a range of 20 percent to 60 percent of the first distance;
a first portion having a first thickness;
and a second portion having a second thickness, wherein the first thickness is less than the second thickness; and
a shank extending from the head portion, wherein a cavity extends through the head portion and at least partially into the shank,
wherein the first portion is intermediate the second portion, and the shank and the head portion extends around a periphery of the shank.

15. The rivet of claim 14, wherein the first thickness is at least 0.1 mm less than the second thickness, $t_2$.

16. The rivet of claim 14, wherein the head portion comprises at least one of a stepped profile, a tapered profile, and a curved profile.

17. A rivet suitable for use in a rivet delivery channel of a rivet delivery system, the rivet comprising:
a head portion extending a first distance along a longitudinal axis of the rivet, the head portion comprising:
a blunt outer edge defining an annular shaped first cavity configured to inhibit point-to-point contact on a beveled edge, thereby inhibiting wedging forces that lead to rivet jamming in precision feed tracks, and wherein the blunt outer edge extends a second distance in a direction of the longitudinal axis in a range of 20 percent to 60 percent of the first distance; and
a shank extending from the head portion, wherein a cavity extends through the head portion and at least partially into the shank.

* * * * *